July 15, 1969     T. S. BETTENCOURT     3,455,448
AIR NOZZLE CLEANING DEVICE FOR CROP HARVESTERS
Filed Aug. 24, 1967
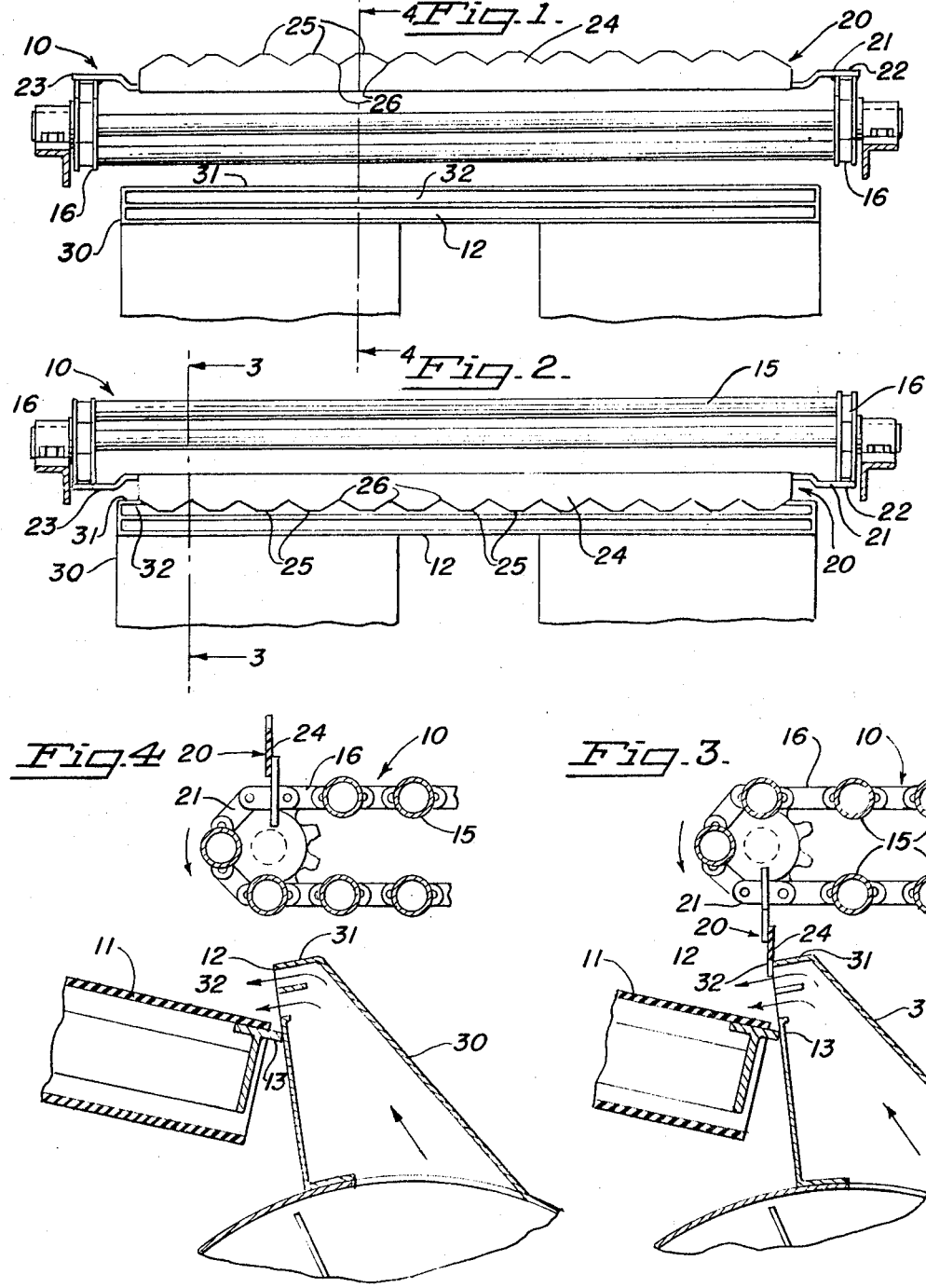
INVENTOR
THOMAS S. BETTENCOURT
BY
Owen, Wickersham & Erickson
ATTORNEYS United States Patent Office 3,455,448
Patented July 15, 1969

3,455,448
AIR NOZZLE CLEANING DEVICE FOR CROP HARVESTERS
Thomas S. Bettencourt, Walnut Grove, Calif., assignor to The Regents of the University of California, Berkeley, Calif.
Filed Aug. 24, 1967, Ser. No. 663,006
Int. Cl. B07b 3/04
U.S. Cl. 209—134      5 Claims

ABSTRACT OF THE DISCLOSURE

In a tomato harvester having rear cross-conveyors and a collecting conveyor for carrying separated fruit to and dumping it on the rear cross-conveyors, there is often a blower having a housing with an upper wall just below the collecting conveyor means and a nozzle between the dumping end of the collecting conveyor and the cross-conveyors. The collecting conveyor comprises a series of parallel transverse bars, and in the present invention at least one of these bars is replaced by a nozzle wiping means comprising a metal support bar inset between its ends and having molded thereto a resilient flexible rubber wiper of sufficient length to engage the upper front edge of the nozzles and to wipe clean the top of the nozzle housing. The wiper has a series of notches along its edge deeper than the amount of engagement with said upper edge of said nozzle, spaced apart by unnotched portions; the portions between notches thereby having individual flexing ability.

---

This invention relates to an improved cleaning device for mechanical harvesters such as tomato harvesters.

In harvesters such as tomato harvesters the plants are severed from their roots, are picked up and elevated and carried to a separating device which separates the fruit from the stems and leaves. The fruit then falls to and is carried by a collecting conveyor.

In certain harvesters, the collecting conveyor carries the fruit back to the rear end of the machine, while elevating it, and dumps it on a pair of rear cross-conveyors which move out to each side of the machine. These cross-conveyors, in turn, carry the fruit out to the side and dump the fruit on forwardly moving conveyors which carry the fruit toward the front of the machine while it passes by a number of sorters, who cull out the undesirable fruit.

At the point where the collecting conveyor dumps the fruit onto the rear cross-conveyors, certain harvesters have found it desirable to provide a forced air system which blows away the leaves and other light matter while leaving the heavier fruit. The blower typically has a wide, flat nozzle lying directly between the collecting conveyor and the cross-conveyors.

A problem met with this type of device has been that trash carried by the collecting conveyors has sometimes been stuck between the nozzle and the collecting conveyor. The collecting conveyor being of an endless type turns around a sharp corner at the upper end of its path where it dumps the fruit from its rearwardly moving upper reach onto the cross-conveyors, and its lower reach then moves forwardly at a point just above the nozzle. Trash has tended to build up in this space and eventually to block the nozzle. In spite of the fact that a strong current of air passes through the nozzle, the movement of the lower reach of the collecting conveyor in the direction opposite to the air current has tended to hold the trash in that space and enabled it to build up until it has sometimes obstructed the nozzles and stopped them or at least greatly reduced the efficiency of the air-separating operation. Small vines and weeds have been the principal offenders. The conveyor has been prevented from pulling such material on with it by the airstream, while the nozzle has been prevented from blowing the material away because portions of it were trapped between the nozzle and the conveyor.

The present invention solves this problem by providing the collecting conveyor with a wiping bar, which comes across the upper edge of the nozzle and wipes off the upper edge. Any wiped-off trash is carried along with the collecting conveyor a distance sufficient to free it from the nozzle, usually dumping it to the ground. Thus the nozzle is kept free for efficient action.

Other objects and advantages of the invention will appear from the following description of a preferred embodiment thereof.

In the drawings:

FIG. 1 is a view in elevation and partly in section of the rear end of a tomato harvester showing the rear end of the collecting conveyor, the nozzle, and a portion of the rear cross-conveyors. A wiping bar is shown about to turn the circle at the end of the collecting conveyor.

FIG. 2 is a view similar to FIG. 1 with a wiper bar shown in its wiping position.

FIG. 3 is an enlarged view in section taken along the line 3—3 in FIG. 2.

FIG. 4 is a view similar to FIG. 3 of an enlarged view in section taken along the line 4—4 of FIG. 1 showing the wiper in a slightly earlier position.

In order to avoid unnecessary descriptions, the drawing shows only the pertinent portions, namely a collecting conveyor 10, a pair of rear cross-conveyors 11 and 12 and a nozzle 13. The rear cross-conveyors 11 and 12 may be of the belt type, one moving to each side, although of course the invention can be practiced if there is only one of them. The rear cross-conveyors slope upwardly from side edge to side edge, toward the rear so that as the nozzle 13 blows a strong current of air across them, the tomatoes are not actually blown off the rear edge but simply are blown somewhat up from the lower or forward edge. The strong current of air, however, does carry away light trash such as leaves and stems.

The collecting conveyor 10 is of the bar type shown in U.S. Patent No. 3,206,011. Its lower end, which is not shown, lies beneath a separating device (not shown), and the tomatoes or other fruit fall down on to it, along with some leaves and stems, and it then carries them upwardly to its rear end shown in the drawings. The conveyor 10 is made up of a plurality of bars 15 extending across between a chainlike mechanism 16 on each side, which may be provided with rollers 17 or other means for locomotion. The bars 15 are preferably metal tubes such as are shown in the drawings and extend straight across.

In the present invention at least one of the bars 15 is replaced by a wiping bar 20. The bar 20 comprises a steal bar 21 which is instepped in between its ends 22 and 23 and is provided with a molded rubber wiping member 24, perferably having a plurality of wiping portions 25 extending out from V-notches 26. The notches 26 enables the wiping portions 25 to flex individually from each other rather than the member 24 having to flex as a whole across its full width, and thereby enable better wiping at each point. The points missed in between are generally negligible since the wiping mechanism comes down far enough to leave relatively small space in between.

Plant material which gets in between the bottom part of the conveyor 10 and the nozzle 13 and tends to obstruct the nozzle 13 is therefore wiped completely clean of the nozzle 13.

It will be noted in FIGS. 3 and 4 that the nozzle 13 itself has a housing 30 and that the short upper wall 31 is where the weeds and vines have tended to be trapped. In this invention, therefore, the nozzle top plate 31 is wiped off by the flexing wiper member 20 once in each circuit of the collecting conveyor 10. The wiper 20 extends down below the top edge 32 of the nozzle 13 a short distance, not enough to really substantially interfere with the flow of air, and since this is a momentary wiping there is not much time of interference in any event. Then it continues on wiping across the front surface. As a result, the nozzle 13 is kept free from obstructions, and no obstructions can build up in the space 33 between the conveyor 10 and the top edge 32 of the housing 30. The weeds and other obstructions are carried on and dumped down the sloping side of the blower where they fall to the ground.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a tomato harvester having a rear cross-conveyor means, collecting conveyor means for carrying separated fruit to and dumping it on said rear cross-conveyor means and an air blowing means having a housing with an upper wall just below said collecting conveyor means and a nozzle between the dumping end of the collecting conveyor means and the rear cross-conveyor means, said collecting conveyor comprising a series of parallel transverse bars, the improvement comprising at least one bar of the collecting conveyor being replaced by a nozzle wiping means comprising a metal support bar inset between its ends and having molded thereto a resilient flexible rubber wiper of sufficient length to engage the upper front edge of the nozzle and to wipe clean the top of a nozzle housing.

2. The device of claim 1 wherein said wiper has a series of notches along its edge, spaced apart by unnotched portions and extending into said edge, the portions between notches thereby having individual flexing ability.

3. The device of claim 2 wherein said notches are deeper than the amount of engagement with said upper edge of said nozzle.

4. In a tomato harvester having rear cross-conveyor means, collecting conveyor means comprising a series of parallel transverse bars for carrying separated fruit to and dumping it on said rear cross-conveyor means and air blowing means having a housing with an upper wall just below said collecting conveyor means and a nozzle outlet below said upper wall and above the adjacent edge of said rear cross-conveyor means, the improvement comprising at least one bar of said collecting conveyor comprising a metal support bar having secured thereto a resilient flexible rubber wiper arranged to engage the upper front edge of the nozzle outlet and to wipe clean the top of said upper wall.

5. The device of claim 4 having the wiping edge of said wiper provided with a series of spaced-apart notches deeper than the engagement depth of said wiper with said nozzle front edge and with said upper wall.

References Cited

UNITED STATES PATENTS

| | | | |
|---|---|---|---|
| 1,962,668 | 6/1934 | Olney | 209—136 |
| 2,693,068 | 11/1954 | Rodin | 209—136 |

RICHARD E. AEGERTER, Primary Examiner